United States Patent
Klatt

[11] 3,918,766
[45] Nov. 11, 1975

[54] INDIVIDUAL WHEEL ANTI-SKID BRAKE CONTROL SYSTEM HAVING MEANS TO PREVENT EXCESSIVE BRAKE PRESSURE DIFFERENCES

[75] Inventor: Alfred Klatt, Ronnenberg, Germany

[73] Assignee: WABCO Westinghouse G.m.b.H., Hannover, Germany

[22] Filed: Feb. 4, 1974

[21] Appl. No.: 439,021

[30] Foreign Application Priority Data
Apr. 21, 1973   Germany............................ 2320559

[52] U.S. Cl. .............................. 303/21 P; 303/20
[51] Int. Cl.² ........................................... B60T 8/08
[58] Field of Search ................ 188/181; 235/150.2; 303/20, 21; 307/10 R; 317/5; 324/161–162; 340/53, 62

[56] References Cited
UNITED STATES PATENTS

| | | | |
|---|---|---|---|
| 3,637,264 | 1/1972 | Leiber et al. | 303/21 BE |
| 3,756,663 | 9/1973 | Fink et al. | 303/21 BE |
| 3,768,874 | 10/1973 | Riordan | 303/21 BE |
| 3,802,749 | 4/1974 | Carp et al. | 303/21 EB X |

*Primary Examiner*—Trygve M. Blix
*Assistant Examiner*—Stephen G. Kunin
*Attorney, Agent, or Firm*—R. W. McIntire, Jr.

[57] ABSTRACT

Electronic brake control circuitry for modulating vehicle brake pressure on an individual wheel basis is provided with apparatus for invoking a holding phase during the build-up of brake pressure on a non-skidding wheel when the brake pressure at the opposite wheel of an automotive vehicle is exhausted due to a wheel skid being detected at the latter wheel, thereby preventing a large difference from arising between the individual wheel brake pressures to avoid severe vehicle instability. In the event both wheels skid, the influence of one wheel upon the other is terminated and each wheel brake pressure is controlled individually according to the skid condition of that particular wheel.

3 Claims, 3 Drawing Figures

INDIVIDUAL WHEEL ANTI-SKID BRAKE CONTROL SYSTEM HAVING MEANS TO PREVENT EXCESSIVE BRAKE PRESSURE DIFFERENCES

BACKGROUND OF THE INVENTION

The present invention is concerned with an anti-skid automotive brake control system in which individual wheel brake control is provided by means of an electronic evaluation circuit whose output influences the braking torque on the wheel in accordance with input signals fed to a brake control circuit by wheel scanning apparatus, which continuously monitors the dynamic behavior characteristics of the wheel.

The fact that each wheel braking torque is individually controlled to provide optimum wheel skid control and accordingly maximum vehicle retardation under varying wheel to road surface conditions, non-uniform wheel to road adhesion will produce different braking torques on the wheels. If these different braking torques should appear, for example, between the left and right wheels of the same axle due to the road surface encountered by these wheels having a different value of friction, the vehicle will yaw and consequently swerve toward the side of the roadway having the higher friction value. This forces the driver of the vehicle to react to this swerving tendency by steering the vehicle in a direction opposite the direction of yaw.

In the event of a strong brake application, as occurs for example in a panic situation, the swerving tendency becomes quite severe with the natural result of a strong counter-reaction on the part of the driver. This, in turn, results in the vehicle being over-steered past the normal direction of travel such that the vehicle then swerves in a direction opposite the direction of yaw. Only after several cycles of these over-steering maneuvers is the vehicle able to be more easily steered and finally guided in the desired direction of travel.

The severity of these steering oscillations of the vehicle at the time each brake application is initiated depends upon the intensity of the brake application, the difference between the friction values to which the respective wheels are subjected and the speed at which the driver reacts to the swerving. Obviously, the more severe the swerving, the more turning effort required by the driver in correcting the direction of vehicle travel. The vehicle swerving resulting from such disproportionate braking presents a very real crash hazard in addition to the less critical problem of increased steering effort.

SUMMARY OF THE INVENTION

The main object of the present invention is to provide an improved anti-skid brake control system for modulating the braking torque on the individual wheels of a vehicle in such a manner as to prevent severe swerving of the vehicle when initiating a brake application while driving on a roadway which produces a different adhesion couple with the respective vehicle wheels.

It is a further object of the invention to reduce the steering effort on the part of the driver required to bring a vehicle swerve under control so that the magnitude of the initial steering oscillations are minimal and accordingly fewer oscillations are required to bring the vehicle back to the desired direction of travel.

These objects are accomplished according to the present invention by causing the brake pressure on a first vehicle wheel having a higher road adhesion than a second wheel on the side of a vehicle opposite the first wheel to assume a holding phase when a skidding tendency of the second wheel is indicated. During this holding phase, the first wheel brake pressure is held constant at a level attained at the time the skidding tendency of the second wheel is indicated, while the second wheel brake pressure is initially released to overcome its skidding tendency and subsequently held at a constant level until reacceleration occurs. When normal wheel rotation is subsequently restored, the first and second wheel brake pressures are reapplied at a controlled rate until whichever one of the wheels having the lower road adhesion experiences a skidding tendency to initiate another control cycle. Such controlled modulation of the brake forces during a wheel slip thus prevents large disparities between the opposing wheel brake forces from arising so that less initial steering response to the resulting vehicle yaw is required and consequently less oversteering correction and oscillation results.

Other objects and advantages of the invention will be realized from the following more detailed description taken in accordance with the accompanying drawings in which.

DESCRIPTION AND OPERATION

Figure 2:
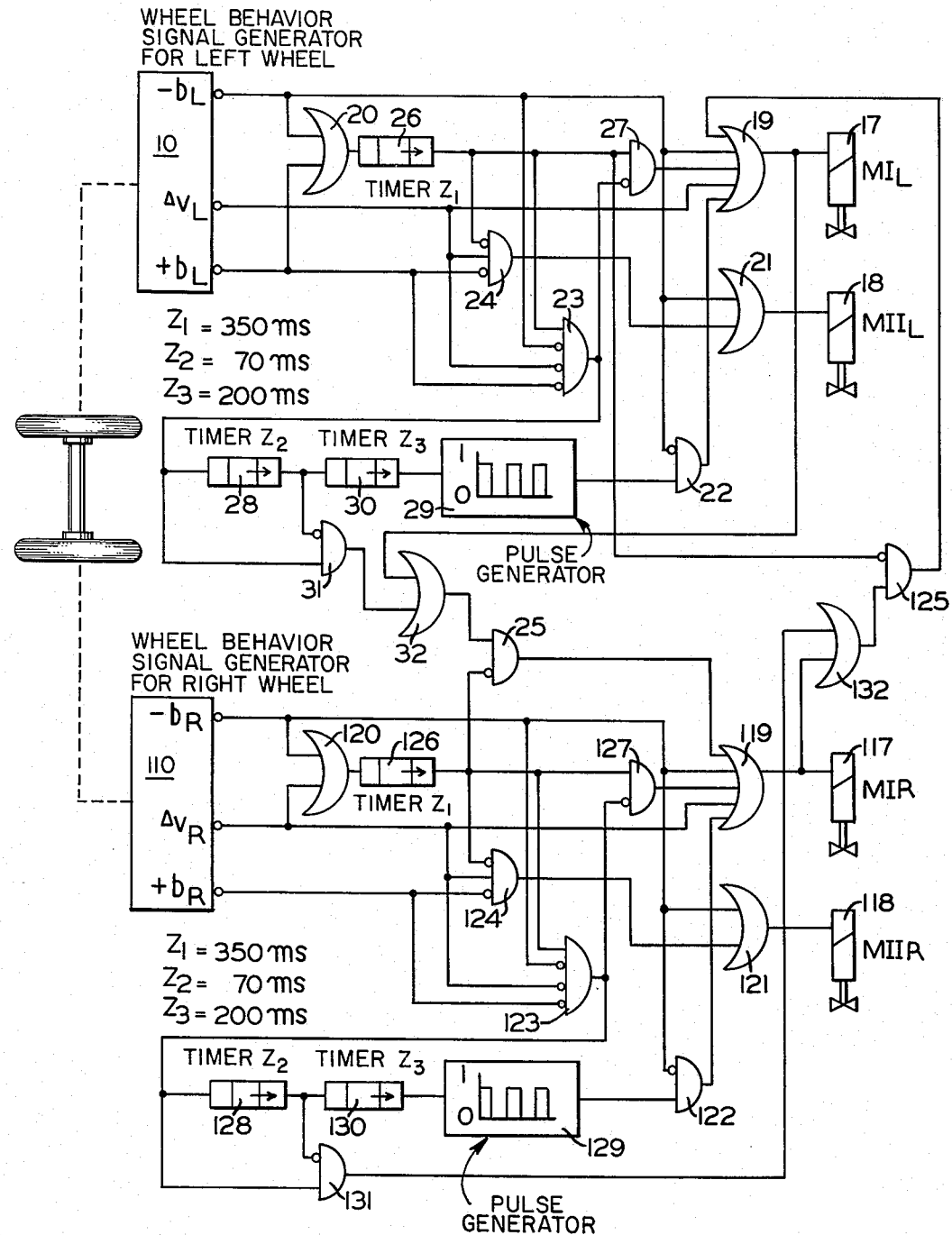
FIG. 2 shows the wheel skid control circuitry and for the opposing wheels of the same axle on an automotive vehicle and the interconnection of such circuitry in accordance with the present invention.

Referring to FIG. 2, input signals $-b_L$, $\Delta V_L$ and $+b_L$ are obtained from a conventional signal generator 10 which monitors the dynamic behavior characteristics of the left wheel of an automative vehicle. Similar signals $-b_R$, $\Delta V_R$ and $+b_R$ are provided by a signal generator 110 associated with the right wheel of the vehicle, said left and right wheels being preferably carried by a common axle. The $-b$ signal for either the left or right wheel is indicative of that wheel decelerating at a rate exceeding a predetermined threshold at which the deceleration is likely to cause a wheel skid. The $\Delta V_L$ or $\Delta V_R$ signal for the respective left or right wheel is generated when the wheel velocity $V_{RL}$ or $V_{RR}$ becomes a predetermined percentage less than a reference velocity $V_{ref}$ shown associated with the curve appearing in FIG. 3. The $+b$ signal of either the left or right wheel is generated when the wheel velocity reaches a certain acceleration at the time a skidding wheel is regaining synchronous rotation.

The $-b_L$ signal is connected directly to one input of an OR gate 19, an OR gate 20, and OR gate 21 and to an inverted input of an AND gate 22 and an AND gate 23.

The $\Delta V_L$ signal is fed directly to another input of the OR gate 19 and the input of an AND gate 24, as well as to an inverted input of AND gate 23.

The $+b_L$ signal is connected directly to another input of OR gate 20, as well as to another inverted input of AND gates 23 and 24.

The signal emitted by OR gate 20 is transmitted to a release lag timing circuit 26, whose output signal is maintained a predetermined duration $Z_1$ after the input signal supplied by OR gate 20 disappears. The output signal of timing circuit 26 is fed to an input of an AND gate 27 and AND gate 23, as well as to another inverted input of AND gate 24.

The output signal of AND gate 24 is connected to the second input of OR gate 21, whose output signal controls energization of a solenoid 18 of an electro-pneumatic modulating valve MII$_L$, located in the delivery line of the left wheel brake cylinder device, not shown. In the energized state of solenoid 18, modulating valve MII$_L$ is actuated to a position in which the brake cylinder pressure is exhausted to atmosphere and in the deenergized state, is actuated to a position interrupting the exhaust of brake cylinder pressure.

The output signal emitted by AND gate 23 is transmitted to the inverted second input of AND gate 27, one input of an AND gate 31 and to the input of a response lag timing circuit 28, whose output signal fails to appear until a predetermined duration $Z_2$ after an input signal is supplied. During timing period $Z_2$, reapplication of brake pressure $P_L$ or $P_R$ is provided to overcome the braking hysteresis as set forth in copending U.S. patent application, Ser. No. 404,849, entitled "Anti-Wheel Skid Control System Providing Controlled Reapplication of Brake Pressure." The output signal of timing circuit 28 is connected to a negated input of AND gate 31 and via a release lag timing circuit 30, having a timing period $Z_3$, to a conventional pulse generator 29. The output signals of pulse generator 29 are transmitted to the second input of AND gate 22, whose output is connected to another input of OR gate 19.

OR gate 19, to which is also connected the outputs of AND gates 22 and 27, has its output connected to a solenoid 17 of an electro-pneumatic modulating valve MI$_L$ also located in the brake cylinder delivery line of the left wheel ahead of modulating valve MII$_L$. In the energized state, solenoid 17 causes actuation of modulating valve MI$_L$ to a position in which the delivery of brake cylinder pressure is interrupted and when deenergized, positions valve MI$_L$ to effect the supply of delivery pressures to the brake cylinder.

The output of OR gate 19 is also connected to one input of an OR gate 32. The output of AND gate 31 is connected to the other input of OR gate 32, whose output is, in turn, connected to one input of an AND gate 25.

The additional circuitry of FIG. 2 associated with the right wheel brake cylinder is identical to that of the left wheel, as above described, with the corresponding parts being denoted by reference numerals increased by a value of one hundred. These control circuits are interconnected with each other via AND gates 25 and 125. The output of timer circuit 126 is connected to the negated input of AND gate 25, while the output of timer circuit 26 is connected to the negated input of AND gate 125. The output of AND gate 125 is connected to an input of OR gate 19 for driving modulating valve MI$_L$ of the left wheel circuitry, while the output of AND gate 25 is connected to an input of OR gate 119 for driving modulating valve MI$_R$ of the right wheel circuitry.

Figure 3:
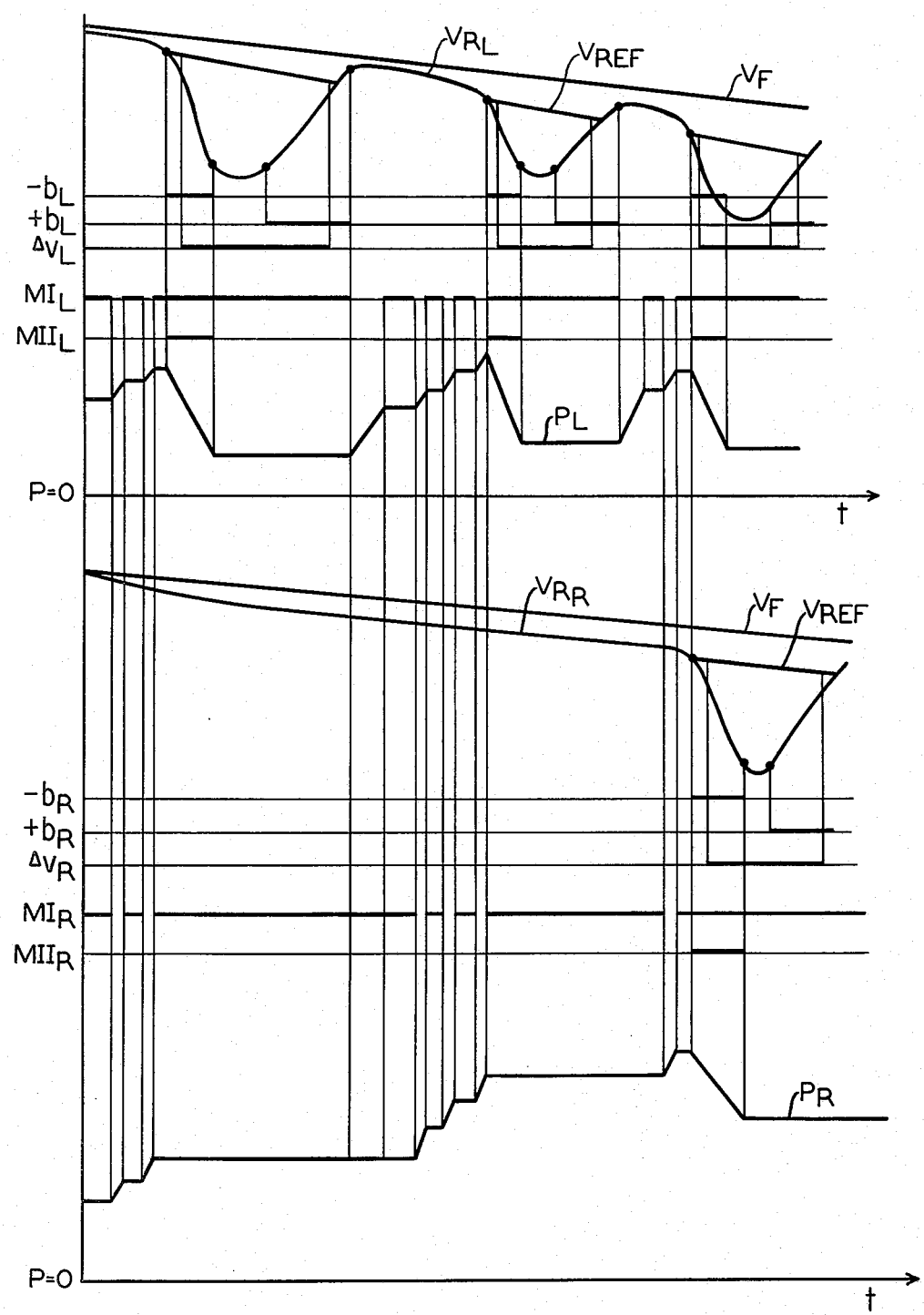
FIG. 3 shows a graph of the individual wheel braking pressures produced in accordance with the circuitry of FIG. 2.

The operation of the system through the circuitry of FIG. 2 can be more easily understood from reference to the graph of FIG. 3, which illustrates the relative left and right wheel brake pressures under conditions of unequal wheel adhesion. It is assumed that the adhesion between the left wheel and road is less than that between the right wheel and road so that the left wheel will tend to skid prior to the right wheel when the brakes are applied. When the preselected deceleration threshold is exceeded, indicating such skidding tendency of the left wheel, the $-b_L$ signal will appear.

With the presence of the $-b_L$ signal, the solenoids 17 and 18 of modulating valves MI$_L$ and MII$_L$ are each energized via OR gates 19 and 21, respectively to interrupt further delivery of brake cylinder pressure and to exhaust the existing brake cylinder pressure at the left wheel. Concurrently, OR gate 32 is enabled by the output signal from OR gate 19 to present a logical "1" signal to AND gate 25. Since the negated input of AND gate 25 is presented with a logical "0" signal from timer circuit 126 due to the absence of a $-b_R$ signal from the right wheel, AND gate 25 is enabled to drive OR gate 119 and accordingly effect energization of solenoid 117 of the right wheel modulating valve MI$_R$. This results in the termination of any further buildup of brake pressure at the right wheel, while the left wheel brake pressure is being exhausted. It is to be understood that the output of OR gate 119 is prevented from influencing the left wheel modulating valve MI$_L$ via OR gate 132, AND gate 125 and OR gate 19, since AND gate 125 is disabled by the presence of a logical "1" signal at its negated input for a duration $Z_1$ provided by timer circuit 26 and representing a wheel skid control period for correcting the wheel skid condition. Thus, whenever one of the wheels exhibits a tendency to lock-up, the left wheel in the assumed instance, that wheel brake pressure is exhausted while the other wheel is forced into a holding phase so that the difference between the individual wheel brake forces is not excessive and accordingly, the steering force required to counteract the vehicle yaw resulting from such unequal brake forces is minimal. Furthermore, any influence upon the skidding wheel control circuitry by the right wheel control circuitry is prevented so that the skidding wheel brake control is responsive only to the conditions existing at the skidding wheel for a predetermined duration sufficient to correct such skidding and restore normal wheel rotation. The right wheel brake control, however, is at all times subject to an impending skid condition at that wheel, even while under the influence of the above mentioned holding phase imposed by the left wheel brake control circuitry, as hereinafter explained.

When the left wheel deceleration falls below the wheel skid threshold due to the exhaust of the left wheel brake pressure, the $-b_L$ signal disappears and solenoid valve 18 is accordingly deenergized to effect closure of modulating valve MII$_L$ to terminate further exhaust of the left wheel brake cylinder pressure. Due to the reduction of wheel velocity at the time of the wheel skid condition of the left wheel, signal $\Delta V_L$ had been generated at short duration after the $-b_L$ signal. With the $-b_L$ signal now absent, the $\Delta V_L$ signal acting via OR gate 19 establishes the energized condition of solenoid 17 so that modulating valve MI$_L$ continues to interrupt the supply of brake cylinder pressure. During this period, both the left and right wheel brake pressures are thus held constant.

With the left wheel now accelerating in this holding phase, the $\Delta V_L$ signal will eventually disappear as the wheel velocity increases above a certain velocity threshold. This is shown in FIG. 3 to occur at a point in time prior to the wheel acceleration dripping below the predetermined acceleration threshold to that signal $+b_L$ is still present following termination of signal $\Delta V_L$. Accordingly, solenoid 17 of modulating valve $MI_L$ remains energized by reason of the signal $+b_L$ acting through OR gate 20, timer circuit 26, AND gate 27 and OR gate 19. Concurrently, solenoid 117 of modulating valve $MI_R$ is held energized through OR gate 32, AND gate 25 and OR gate 119.

As the wheel acceleration rate begins to level off and finally falls below the acceleration threshold, the $+b_L$ signal disappears. With the $-b_L$ signal already absent, the timer circuit 26 begins to time out to establish period $Z_1$ during which the output of timer circuit 26 is still present and the following brake pressure regulating process takes place.

Since the signals $-b_L$, $\Delta V_L$ and $+b_L$ are all absent at the respective negated inputs of AND gate 23 and the timer output signal is effective at the remaining input, AND gate 23 is enabled and accordingly emits a signal to the negated input of AND gate 27 to disable it. This results in all input signals being absent from OR gate 19 such as to deenergize solenoid 17 and effect the reapplication of brake pressure $P_L$ via modulating valve $MI_L$ to the left wheel brake cylinder. Concurrently, the output of AND gate 23 activates timer circuit 28 and acts via AND gate 31, OR gate 32, AND gate 25 and OR gate 119 to maintain solenoid 117 energized until the delay period of timer circuit 28 expires. When this occurs, timer circuit 28 produces an output at the negated input of AND gate 31, which is accordingly disabled. Concurrently, however, the output of timer circuit 28 activates timer circuit 30, which in turn activates pulse generator 29. As the pulse generator output goes to a logical "1" condition, AND gate 22 is enabled to energize solenoid 17 via OR gate 19 and again terminate the reapplication of brake pressure $P_L$ to the left wheel brake cylinder via modulating valve $MI_L$. This first step in the reapplication of brake pressure $P_L$ thus takes place for a period corresponding to the duration $Z_2$ provided by timing circuit 28. During this period, it will be seen from FIG. 3 that the right wheel brake pressure $P_R$ remains at a substantially constant level due to the fact that the output of OR gate 19 acts through OR gate 32, AND gate 25 and OR gate 119 to maintain solenoid 117 energized upon AND gate 31 becoming disabled.

Until this first pulse emitted by pulse generator 29 expires, both the left wheel brake pressure $P_L$ and the right wheel brake pressure $P_R$ remain unchanged. Then for the remainder of timing period $Z_3$ or until another wheel skid condition arises, the outputs of OR gates 19 and 119 follow the output of pulse generator 29 to simultaneously either energize or deenergize solenoids 17 and 117 of modulating valves $MI_L$ and $MI_R$, thereby resulting in the intermittent reapplication of brake pressures $P_L$ and $P_R$, as shown in FIG. 3.

It is to be understood, therefore, that the braking force applied to the left wheel having the lower adhesion is modulated upon appearance of the $-b_L$ signal indicating a skidding tendency of that wheel, while the braking force applied to the right wheel is held constant during a holding phase. This holding phase of the right wheel is in continuous alternation with a pressure reapplication phase as the left wheel brake force is alternatively decreased and then reapplied during the period this left wheel is exhibiting a skidding tendency due to its low adhesion. This periodic reapplication of brake pressure $P_R$ at the right wheel is influenced by the left wheel brake control circuitry and continues until a signal $-b_R$ appears indicating a locking tendency of the right wheel, as seen to occur in the third regulating cycle of FIG. 3.

The signal $-b_R$ acts through OR gate 120 to activate timer circuit 126, whose output disables AND gate 25 to prevent the left wheel brake control circuitry from exerting any further influence upon the right wheel. Concurrently, signal $-b_R$ acts through OR gate 119 and OR gate 121 to energize solenoids 117 and 118 of modulating valves $MI_R$ and $MII_R$. This terminates further reapplication of brake pressure $P_R$, which is then exhausted to relieve the excessive brake force on this right wheel. As long as timing period $Z_1$, provided by timer circuit 26 of the left wheel control circuitry is still in effect, the output of timer circuit 26 will maintain AND gate 125 disabled. Thus, AND gates 25 and 125 are both disabled to isolate each wheel brake control circuit from the other and thereby establish individual wheel brake control during the period both the left and right wheel are encountering poor wheel/road adhesion conditions.

When the brake pressure regulating process is terminated on either one of the wheels due to improved adhesion on that particular wheel/road interface, one of the timing durations $Z_1$ will expire to release the disabling signal at one of the AND gates 25 and 125, thereby allowing the brake pressure on whichever wheel is experiencing the greater adhesion to be influenced by the brake control circuitry of the other wheel to avoid large disparities in the wheel brake forces obtained.

Figure 1:
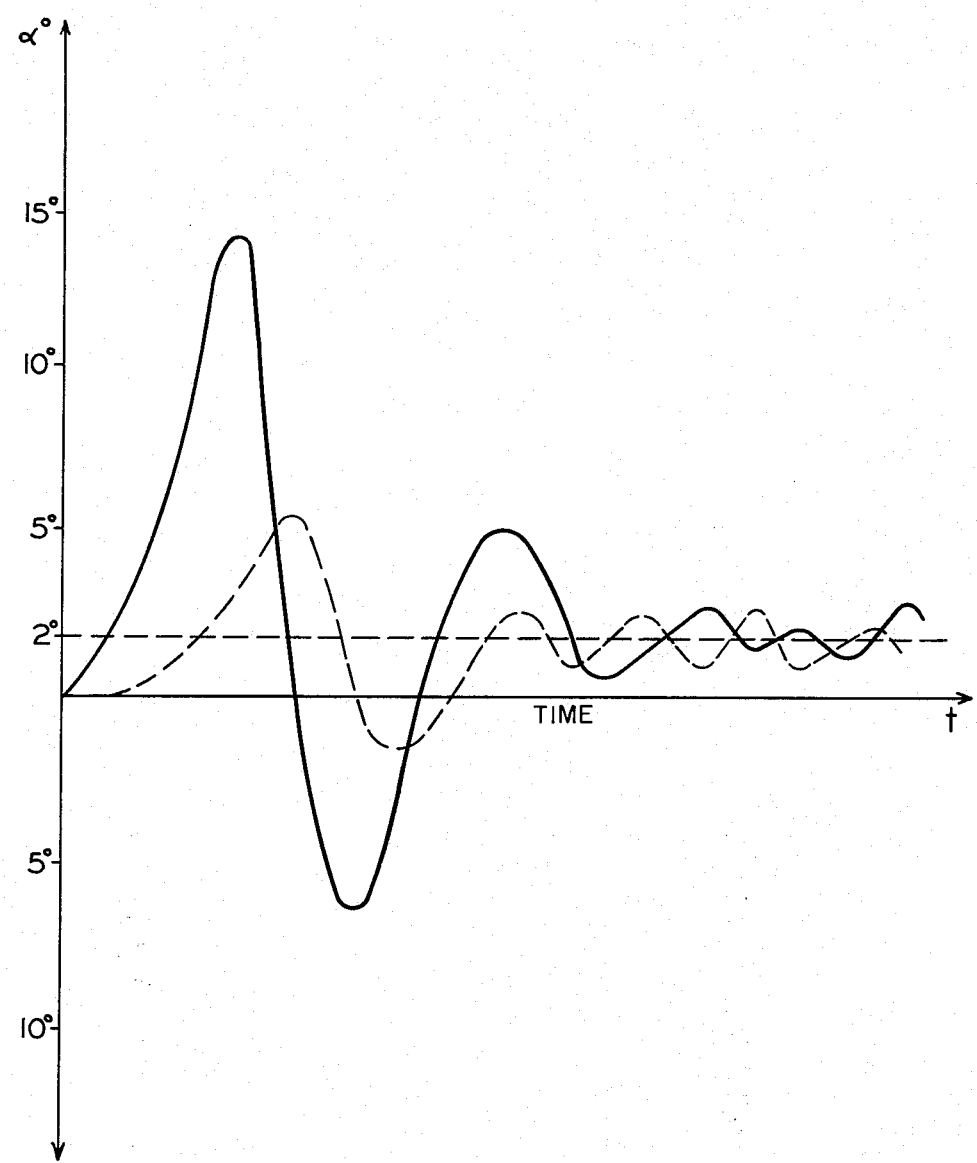
FIG. 1 shows a typical steering oscillation curve for a vehicle having conventional control means for individual wheel skid control (solid line) and wheel skid control means in accordance with the present invention (broken lines)

The driver of a vehicle being braked in accordance with the present invention is freed of excessive steering effort in attempting to control the vehicle during the initial regulating cycles, since large differences between the brake forces of a skidding and non-skidding wheel are prevented from occurring. Such relaxed steering effort results in less severe over-steering oscillations, as represented by the broken line in FIG. 1, due to the smaller skewing angle of the vehicle, and thereby provides the driver with increased time in which to adjust to the required steering correction, while providing for improved driving stability.

Having now described the invention what I claim as new and desire to secure by letters Patent is:

1. A fluid pressure actuated anti-skid brake control system for a vehicle having a pair of brake equipped, independently rotatable wheels on opposite ends of an axle, said system comprising:
   a. signal generator means for each of said wheels for providing a deceleration signal indicative of a skid condition of the respective wheels;
   b. valve means for each of said wheels for effecting independent control of fluid brake pressure at the respective wheels;
   c. logic means for each of said wheels responsive to said deceleration signal thereof for providing a first output signal in response to which said valve means of a skidding one of said wheels is operated to terminate the supply of fluid brake pressure thereto and to concurrently release fluid brake pressure therefrom, said logic means of the respective wheels being interconnected such that said first output signal is connected to said valve means of the other one of said wheels for terminating the supply of fluid brake pressure thereto in the absence of a wheel skid thereof, whereby the brake pressure of the non-skidding other one of said wheels remains substantially constant when brake pressure is being released at the skidding one of said wheels, each of said logic means comprising:

i. first AND gate means via which said first output signal is connected to said valve means of the other one of said wheels and;

ii. first timer means responsive to said deceleration signal for establishing a wheel skid correction period during which said first AND gate of said logic means of the other of said wheels is disabled to prevent said logic means of a non-skidding wheel from influencing the brake pressure of a skidding wheel.

2. The system recited in claim 1 wherein said logic means further comprises:

a. second AND gate means via which said first timer means acts to provide said first output signal during said correction period;

b. third AND gate means subject to said wheel behavior signals and a signal indicating the presence of said correction period for providing a second output signal to disable said second AND gate when resumption of normal rotation of said skidding wheel is obtained;

c. second timer means initiated by said second output signal of said third AND gate; and d. OR gate means via which said second timer means acts in parallel with said first output signal to actuate said valve means associated with said logic means of said non-skidding wheel to interrupt the supply of brake pressure thereto for a predetermined duration within said correction period in the absence of said first output signal.

3. The system recited in claim 2 wherein said logic means further comprises:

a. third timer means initiated for a predetermined duration in response to expiration of said second timer means; and b. pulse generator means actuated in response to initiation of said third timer means for providing said first output signal intermittently to provide a stepped reapplication of brake pressure via said valve means.

* * * * *